2,782,215

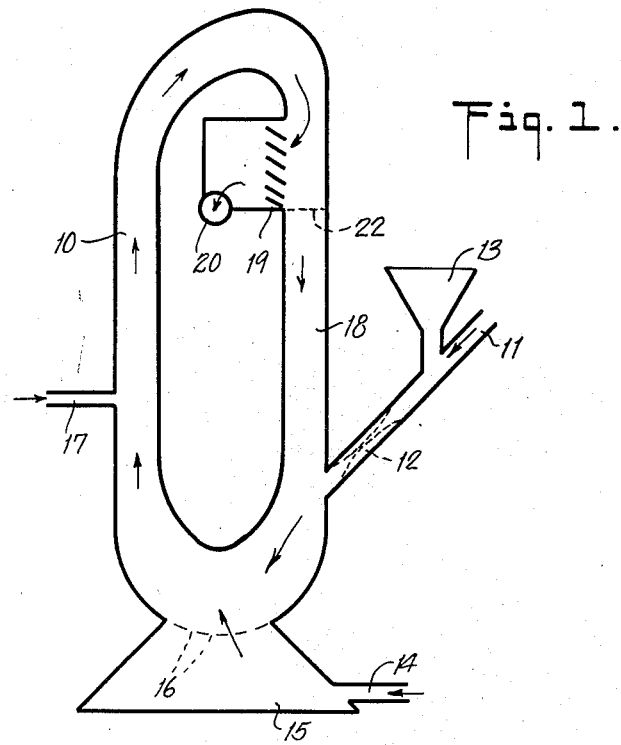
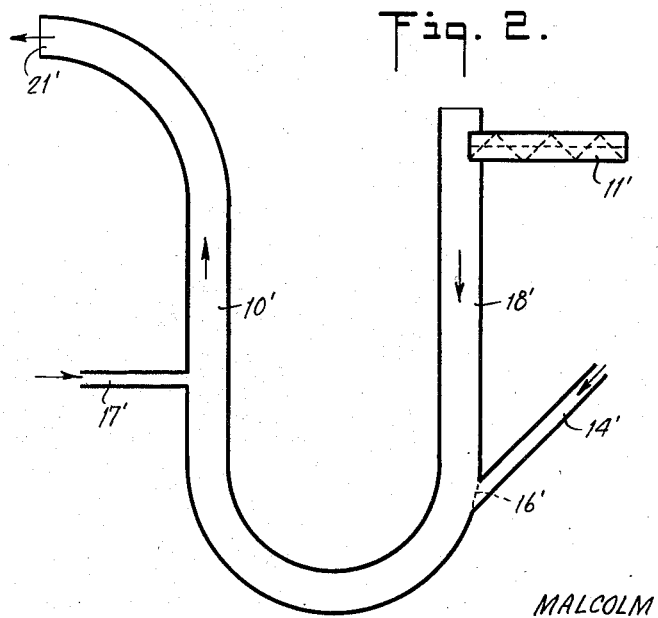

OXIDATIVE ALKALINE FUSION OF ORGANIC COMPOUNDS

Malcolm Kent Smith, Elizabeth, and Laszlo Auer, South Orange, N. J., assignors to The Baker Castor Oil Company, New York, N. Y., a corporation of New Jersey Application December 30, 1952, Serial No. 328,762

16 Claims. (Cl. 260—413)

Reactions involving the oxidation of organic compounds by alkali fusion are known in the art. The conventional processes are cumbersome, and many of the process steps are effected only with difficulty. In general, the prior art processes show low yields, and are of the batch process type.

It is an object of this invention to treat organic compounds by an improved, oxidative alkali fusion process. It is a further object to carry out such reactions in a simple manner, at a rapid rate, and in a continuous operation. Other objects will be apparent from the following description of the invention.

According to the instant invention, organic compounds and strong bases are reacted in finely divided form in an enclosure at elevated temperatures. A feature of this process is that the reaction mixture may desirably be suspended in the reaction enclosure by means of an elastic fluid.

This application contains subject matter related to a copending application Serial No. 283,645, filed in the name of Malcolm Kent Smith on April 22, 1952, for "Alkali Conversion of Ricinoleic Compounds."

According to one embodiment of this invention, an alkali salt of the organic compound to be oxidized is intimately mixed with a stoichiometric excess of the alkali to be used for the fusion reaction. This mixture desirably has a low moisture content, preferably less than about 5%. When this mixture is in the solid rather than in the liquid state, it is preferred that its particle size not exceed about ten microns. Following the preparation of this mixture, it is charged, in the form of a fine cloud or mist, into an enclosure which is maintained at an elevated temperature and at substantially atmospheric pressure. Simultaneously with the introduction of the charge, an elastic fluid may be introduced into the enclosure, for the purpose of acting as a carrier for the finely divided reaction mixture. Some of the alkali fusion reactions require one mole of water per mole of the alkali salt of the organic compound to be oxidized; this water for the reaction can be provided in the finely divided reaction mixture, or can be injected in the form of steam into the enclosure, this steam then serving the dual roles of providing water for the reaction and of acting as an elastic fluid. The steam may also serve as a source of heat for effecting the reaction. In any event, the temperatures in the reaction enclosure are desirably maintained in the range from about 180° to 425° C. Under these conditions, the reaction goes to completion within a short time, down to a few seconds, and can readily be effected in a continuous manner.

The organic compounds suitable for use in the process of this invention are those which can be oxidized by means of alkali fusion. A typical listing of such compounds includes: unsaturated, aliphatic carboxylic acids, such as crotonic acid, tiglic acid, angelic acid, undecylenic acid, oleic acid, and recinoleic acid; aliphatic mercaptans, such as propyl mercaptan, heptyl mercaptan, hendecyl mercaptan, heneicosyl mercaptan, unsaturated mercaptans, and dimercaptans, as well as the corresponding thioethers; and cyclic sulfonic acids, such as benzene sulfonic acid, naphthalene sulfonic acid, anthraquinone mono-sulfonic acid, di-methyl-alpha-naphthylamine sulfonic acid, and lignin sulfonic acid. Other suitable compounds for use in the process of this invention are the esters, amides, and similar functional derivatives of the foregoing organic compounds. Where feasible, the salt of the organic compound may be prepared before the compounds is introduced into the reactor. Alternatively, the organic compound may be introduced as such into the reactor, enough additional strong base being charged to the reactor to form the salt of the organic compound in situ; or in those cases where the organic compound does not form a salt, the amount of base added is that required for the oxidation of such organic compound.

The strong base which is used for the fusion reaction may suitably be selected from the group consisting of alkali, alkaline earth, and quaternary ammonium oxides, hydroxides, and carbonates. Other strong bases, or compounds which decompose under the reaction conditions to yield strong bases, may be used for the fusion reaction. Normally, it is preferred to use an alkali metal hydroxide as the strong base.

Various procedures may be used for the preparation of the reaction charge. One procedure involves premixing of the reactants by, e. g., adding an aqueous solution of the strong base to an aqueous solution of the salt of the organic compound. If necessary, the mixed solutions can be diluted with water to yield a clear solution which may have, e. g., a 25% non-volatile content. The resulting solution is then dried; spray drying results in a finely divided product ready for introduction into the reactor.

The preparation of the reaction mixture may also be carried out in Werner-Pfleiderer jacketed mixers or in a jacketed dough mixer, and higher solids concentrations (prior to drying) are then possible. The product may be dried in such mixers, or other conventional drying methods may be used. On account of hygroscopicity, the mixture of reactants may retain up to about 5% by weight of moisture; this moisture content does not interfere with the reaction, and, in some cases, it is essential that water be present as a reactant in the alkali fusion reaction.

The pre-mixed reaction charge can also be prepared by dry mixing of the strong base with the salt of the organic compound. Such mixing can be carried out in the apparatus of Figure 1 (see below).

The dried mixture, if not in finely divided form, is pulverized to obtain the proper particle size for the reaction. The maximum satisfactory particle size has been found to be about 10 microns, and a suitable lower limit is about 0.5 micron. A preferred range for the size of the particles is 2–8 microns. The grinding of the reaction charge may be effected in the apparatus of Figure 1, dry-compressed air being injected into the apparatus at a temperature of about 100° F. during the grinding operation. The charge may also be ground by mechanical means, such as a high-speed hammer mill.

It will be understood that the ingredients of the foregoing pre-mixed reaction charges can also be introduced separately, in finely divided form, into the reaction enclosure. This also holds true where one or more of the reactants is introduced in liquid state, being normally liquid at room temperature, or being heated to a sufficiently high temperature to become molten before being introduced into the reactor. In the case of liquid reactants, it is extremely desirable that they be introduced into the reaction zone via nozzles which break the liquid up into a fine mist. Where both reactants are liquid, they can be introduced into the reaction enclosure separately, or they can be pre-mixed before such introduction. In the case of one solid and one liquid reactant, it is usually simpler to introduce these reactants into the reaction zone separately.

The oxidative alkaline fusion reaction involves the reaction of, in the case of mono-valent bases, one mole of the salt of the organic compound with one mole of the base; in some cases, one mole of water also enters into the reaction. However, it is desirable to use excess strong base in order to promote the reaction. The base is advantageously used in an amount which is about 1.4 to about 4 or more times the stoichiometric amount of base required theoretically for the fusion reaction. It will be understood that, in cases where the organic compound is used as a starting material in a form other than its salt, and the organic compound is one which is capable of salt formation, sufficient additional base has to be present in the reaction charge for the in situ conversion of such organic compounds into their salts.

It is desirable to introduce steam and/or inert gases into the reactor to serve as a carrier for the reaction mixture. The steam or inert gases can be introduced into the reactor through nozzles which are so arranged that the steam and gases effectively blanket the walls of the reaction chamber. This serves to prevent deposition of the reaction mixture on the walls of the reaction enclosure, the heated elastic fluid (steam or heated inert gases) acting to keep the reaction mixture in suspension and to carry it through and out of the reaction zone in a rapid manner. Also, in cases where the reaction enclosure is heated externally, the elastic fluid acts to prevent contact (and consequent charring) of the reactants or reaction products with the walls of the reaction enclosure. The use of reactants which are liquid, rather than solid, at the reaction temperature, e. g., sodium carbonate forms a low-melting eutectic with sodium hydroxide, also serves to prevent adherence of the reaction mixture to the walls of the reaction chamber. When the reaction temperature is over 300° C., it is important that oxygen be excluded from the reactants and the reaction product, until the latter has cooled to at least below 300° C. The presence of oxygen at the more elevated temperatures results in the formation of undesirable amounts of degradation products.

Steam is the preferred elastic fluid for use in the process of this invention. However, in those cases where the reaction mixture contains ample moisture for the reaction, inert gases, rather than or in addition to the steam, can be used as the elastic fluid. As in the case of the steam, heat for the reaction can be supplied by means of heated inert gases, such as nitrogen and the like. Alternatively, the heat may be supplied by other means, such as dielectric heating. In any case, an elastic fluid should be present in the reactor in order to act as a supporting means and carrier for the reaction mixture.

The velocity with which the steam and/or inert gas is injected into the reaction chamber across the path of the solid or liquid reactants determine, at least partially, the conditions of turbulence in the chamber and the speed with which the reaction can be brought to completion. While supersonic velocities can be used, they are not essential to the instant invention.

SUITABLE REACTORS

The apparatus used to effect the process of the invention may be of widely different types. No more apparatus than a large enclosure, into which the reactants can be projected, is required. It is quite satisfactory to construct the apparatus from cast iron; in order to ensure the maximum purity of the products, stainless steel or nickel equipment may be used.

The process may be carried out, e. g., in the apparatus of Figure 1 which is a schematic diagram of a commercial grinding apparatus which can be desirably utilized in the process of this invention. In Figure 1, the direction of flow of reactants and products is indicated by arrows. The reaction occurs primarily in an elongated vertical leg 10, which may suitably be from 2 to 8 inches in diameter, depending on the amount of production required per unit of time. The reactants, when solid, are charged to hopper 13, if desired via a controlled screw feed (not shown). Such reactants drop from hopper 13 into inlet pipe 11, and are then charged into the reactor by means of an elastic fluid, such as superheated steam. The elastic fluid is introduced into the upper end of inlet pipe 11 by means of a suitable injector. The pipe 11 is provided with a Venturi 12. The passage of the elastic fluid through Venturi 12 creates a partial vacuum on the reactor side of said Venturi, and this effect aids in the introduction of the feed stock into the reactor. The screw feed and hopper 13 are suitably sealed off from the atmosphere. If desired, for example, when one of the reactants is a liquid, there may be more than one inlet pipe 11. When the mixture of reactants is liquid, the screw feed can be replaced by a metering device for introducing the reactants at a desired rate.

The heated elastic fluid, which is preferably superheated steam and/or an inert gas, may be charged through pipe 14 into manifold 15. From the manifold, the heated elastic fluid passes through nozzles indicated at 16, and impinges, in the form of jets, on the reactants charged through pipe 11; the action of the jets of heated elastic fluid directs the reactants up leg 10, creates conditions of turbulence which promote the desired reaction, and the heated fluid serves as a source of heat for the reaction. As stated above, external sources of heat may be applied to leg 10, if it is not desired to supply all of the heat for the reaction by means of the heated elastic fluid. A pipe 17 provides entry into leg 10 for liquids, such as water, which may be injected for purposes of temperature control.

The apparatus is arranged to provide a cycle, including a return leg 18. Near the top of leg 18, a series of baffles may be mounted as indicated at outlet 19. Practically all of the reaction mixture passes out of leg 18 through the outlet 19, and then on to a cyclone and condenser, indicated diagrammatically at 20. In one embodiment of the invention, the leg 18 may be blocked off below the outlet 19 as indicated at dotted line 22, so that entire reaction mixture leaves the apparatus in one pass through the reaction zone via outlet 19. The cyclone serves to separate solids from the vapors, the latter being condensed to a liquid in the condenser.

A small fraction of the reaction mixture, i. e., the coarser portion thereof, drops down leg 18, and is recycled through the reaction zone when leg 18 is not blocked off at 22. The amount of material recycled in this manner can be sharply reduced by eliminating the baffles at outlet 19. If desired, the material passing through the outlet 19 may be recycled, for further reaction, through another reactor similar to that shown in Figure 1. As stated above, the grinding of solid reaction mixtures can be effected in the apparatus of Figure 1. Consequently, a suitable arrangement of such apparatus for continuous operation involves mounting two or more of them in series, the first apparatus being used for grinding of the reaction mixture, and subsequent pieces of apparatus being used for effecting the desired reaction.

The process can be carried out in other equipment. A simpler alternative apparatus is shown in Figure 2 which diagrammatically depicts a straight upright tube 18' for feeding solids or liquids or both, associated with a side tube feed 14' for feeding superheated steam. The lower end of tube 18' is connected by a U-coupling to upright reaction tube 10; the top of which is provided with a connection 21' for discharge of reaction products to a cyclone, a condenser, and other suitable auxiliary equipment. This apparatus is similar in operation to that of Figure 1, when the return leg 18 is blocked off at 22. The feed through pipe 11' into tube 18' can be identical to that through pipe 11, a screw type of feed device being depicted diagrammatically. In Figure 2, the introduction of the heated elastic fluid is shown to take place through pipe 14' and nozzles indicated by dotted lines at 16', the pipe being attached near the bottom of leg 18', instead of as indicated in Figure 1. The exact location of this pipe attachment is not crucial, so long as the jets of heated elastic fluid impinge on the reactant particles in such a manner as to sweep the latter around and up the reaction leg 10'. In fact, heated elastic fluid may be introduced at more than one location along the path of travel of the mixture of reactants. As described before in connection with Figure 1, water or other liquid may be injected for temperature control purposes through pipe 17'. After passing through reaction zone 10', the reaction mixture proceeds, at 21', to a cyclone and condenser such as described in connection with Figure 1, or may be recycled through a second similar reactor.

Other apparatus may also be used in the process of this invention. One of these is the vortex chamber described in U. S. Patent 2,441,613, where non-oxidizing combustion gases may act as the heat source and source of motion of the fine particles of the reaction mixture. In this case, the moisture content of the reaction mixture supplies the required water for the reaction.

The time of reaction can be varied by (1) changes in size of the apparatus, (2) use of reactors in series (with the cyclones), and (3) re-cycling in a given unit by controlled screening at the discharge port.

Examples

OXIDATION OF ALIPHATIC COMPOUNDS

*Example 1.*—Oxidation of crotonic acid. Sodium crotonate (500 lbs.), which had been drum dried, was combined with mechanically ground NaOH (555 lbs.), this amount of NaOH being 3.0 times the theoretical amount required for converting the indicated amount of sodium crotonate into sodium acetate. The resulting mixture was ground in the apparatus of Figure 1, the legs 10 and 18 having a 5-inch diameter, to give uniformity and a smaller particle size. This grinding resulted in an average particle size of 2.7 microns. This fine powder was charged into the apparatus of Figure 1, the legs 10 and 18 having a 4-inch diameter, at the rate of 55 lbs. per hour. The reaction temperature was maintained at 250° C. The source of heat and of moisture for this reaction was superheated steam, which was charged to the reactor at the rate of 8–10 lbs. of steam/lf. of feed stock. Sodium acetate was formed in yields approaching theoretical; and could be readily converted to acetic acid by known methods, if desired.

Under similar reaction condtions, the alkali salts of tiglic acid and angelic acid were converted in good yields to the corresponding salts of acetic acid and propionic acid, these products being formed in approximately equal molar quantities.

*Example 2.*—Oxidation of undecylenic acid. This run was made in apparatus corresponding to that of Figure 2, the legs 10' and 18' having a 4-inch diameter. The undecylenic acid and mechanically ground potassium hydroxide were charged separately to the reactor; the undecylenic acid was warmed somewhat above its melting point of about 20–21° C., and the resulting liquid acid was charged into the reactor through an appropriate nozzle in the form of a fine mist. This run was continued for six hours, the feed rates for undecylenic acid and potassium hydroxide being 14.5 lbs./hr. and 50.5 lbs./hr., respectively. With this ratio of reactants, the amount of KOH used was 10.5 times the theoretical amount required for converting the undecylenic acid into potassium pelargonate and potassium acetate. The reaction temperature was maintained at 295° C., the source of heat and moisture for the reaction being superheated steam charged through nozzles 16' at a rate of 10–11 lbs./lb. of feed stock. The yield of the indicated reaction products amounted to about 85% of theoretical.

*Example 3.*—Oxidation of oleic acid. This run was effected in the same apparatus used in Example 2, and, as in that example, the fatty acid (oleic acid in this instance) and KOH were charged separately, the oleic acid being charged as a liquid. This run proceeded for 5.5 hrs., the feed rates for the oleic acid and KOH being 20 lbs. per hr. and 40 lbs. per hr., respectively. The amount of KOH charged was 9.1 times the theoretical amount required for converting the indicated amount of oleic acid into potassium palmitate and potassium acetate. It should be noted that, as in the preceding run, the initial saponification of the fatty acid charged was effected in situ in the reaction chamber. The reaction temperature for the present run was 310° C. The source of heat and of moisture for the reaction was superheated steam, which was charged at a rate of about 10–11 lbs. per lb. of feed stock. The yield of the indicated products amounted to about 83% of theoretical.

PREPARATION OF VARIOUS FEED STOCKS INVOLVING OXIDATION OF RICINOLEIC COMPOUNDS

*Example 4A.*—A mixture of reactants, suitable for charging in the process of this invention, was prepared by introducing 148 lbs. of 50% NaOH solution plus 150 lbs. of water into a Werner-Pfleiderer mixer. After this solution had been heated to about 90° C., 420 lbs. of the methyl esters of castor oil fatty acids (tech. methyl ricinoleate) were slowly added. While heat was supplied to the mixer by feeding steam into the mixer jacket, the mixing of the material in the mixer was continued until the intermediate smooth paste was converted into granular solids. These solids, which had a moisture content of 10%, were dried in a vacuum oven overnight at 200° F. The resulting solids had the following analysis:

1.18% water
14.38% NaOH
83.8% sodium ricinoleate

This amount of NaOH is about 1.6 times the theoretical amount required for converting the amount of tech. sodium ricinoleate present into sodium sebacate; or, on another basis, about 17.2 parts by weight of NaOH are present per 100 parts by weight of tech. sodium ricinoleate.

This dried mixture was prepared for the fusion reaction by air grinding in the mill of Figure 1, the legs 10 and 18 having a 4-inch diameter. The grinding action changed the granular solid to a very fine, free-flowing powder, having a porosity of 0.461, a specific gravity of 1.32, and an average particle size of 3.0 microns, as determined in an Eimer and Amend sub-sieve sizer.

*Example 4B.*—Similarly, another mixture of reactants, suitable for charging in the process of this invention, was prepared by diluting 238 lbs. of 50% NaOH solution with 250 lbs. of water in a Werner-Pfleiderer mixer. The caustic solution was heated to 90° C., and 420 lbs. of the methyl esters of castor oil fatty acids (tech. methyl ricinoleate) were added to it. The use of this procedure minimizes grain-out of the soap. It is desirable that the initial heating, after the ester addition, be cautious, so that the tendency toward foaming is reduced. Continued mixing and application of heat converted the mixture to granular solids having a 7.1% moisture content. Further drying in a vacuum oven at 200° F. yielded a product having the following analysis:

8.6% water
20.0% NaOH
71.4% sodium ricinoleate

This amount of NaOH is about 2.6 times the theoretical amount required for converting the amount of tech. sodium ricinoleate present into sodium sebacate; this is equivalent to 28.0 parts by weight of NaOH per 100 parts by weight of tech. sodium ricinoleate.

This dried mixture was then ground in the mill used in Example 1. The fine powder which resulted had a porosity of 0.501, a specific gravity of 1.4, and an average particle size of 2.5 microns.

*Example 4C.*—Tech. sodium ricinoleate (436 lbs.), which had been drum dried, was combined with mechanically ground anhydrous sodium carbonate (246 lbs.). This amount of $Na_2CO_3$ is 4.0 times the theoretical amount required for converting the indicated amount of tech. sodium ricinoleate into sodium sebacate. The resulting mixture was ground in the mill used in Example 1 to give uniformity and a smaller particle size. This grinding resulted in an average particle size of 0.5 micron. The resulting fine powder was a suitable feed stock for the process of this invention.

*Example 4D.*—A feed stock was prepared by introducing 290.5 lbs. of 50% NaOH solution plus 115 lbs. of water into a Werner-Pfleiderer mixer. After this solution had been heated to about 90° C., 420 lbs. of the methyl esters of castor oil fatty acids (tech. methyl ricinoleate) were slowly added. While heat was supplied to the mixer by feeding steam into the mixer jacket, the mixing of the material in the mixer was continued until the intermediate smooth paste was converted into granular solids. These solids, which had a moisture content of 10%, were dried in a vacuum oven overnight at 200° F. The resulting solids had the following analysis:

5.2% water
28.7% NaOH
66.1% sodium ricinoleate

This amount of NaOH is about 3.0 times the theoretical amount required for converting the amount of tech. sodium ricinoleate present into sodium sebacate; or, on another basis, about 34.6 parts by weight of NaOH are present per 100 parts by weight of tech. sodium ricinoleate.

This dried mixture was prepared for the fusion reaction by air grinding in the mill of Figure 1. The grinding action changed the granular solid to a very fine, free-flowing powder, having an average particle size of 7.2 microns.

PRODUCTION OF SEBACIC ACID AND RELATED PRODUCTS

*Example 5.*—This run was made in the apparatus of Figure 1, the legs 10 and 18 having an 8-inch diameter. The substantially non-fluid saponified solid feed stock was the product of Example 4B. The feed rate averaged 420 lbs. per hour. The inlet temperature at manifold 15 was maintained at about 400° C., while the temperature at the outlet 19 of the apparatus averaged about 290° C., the pyrolysis reaction temperature in this instance was 345° C. Pressure was atmospheric. The relatively high temperature at the manifold was required for raising the feed stock to the reaction temperature. The source of heat for the reaction was superheated steam, which was charged to the reactor at a rate of 8–12 lbs. of steam/lb. of feed stock. The fusion product was collected in water; pH analysis of the resulting solution revealed that the sebacic acid yield was 80.2% of theoretical. The capryl alcohol yield also approximated 80% of theoretical. Inspection of the apparatus at the conclusion of this and each of the runs described in the following examples showed the interior surfaces to be clean.

*Example 6.*—Tech. potassium ricinoleate (609 lbs.), which had been drum dried, was combined with mechanically ground KOH (259.5 lbs.), this amount of KOH being 3.0 times the theoretical amount required for converting the indicated amount of tech. potassium ricinoleate into potassium sebacate; or, 42.6 parts by weight of KOH per 100 parts by weight of tech. potassium ricinoleate. The resulting mixture was ground in the apparatus of Figure 1, the legs 10 and 18 having a 5-inch diameter, to give uniformity and a smaller particle size. This grinding resulted in an average particle size of 1.9 microns. This fine powder was charged to the apparatus of Figure 1, the legs 10 and 18 having a 4-inch diameter, at the rate of 60 lbs. per hour. The inlet temperature (at manifold 15) was 310° C. while the outlet temperature (at classifier 19) was about 230° C.; the reaction temperature in this run was 270° C. As in Example 5, the source of heat was superheated steam, which was charged at the rate indicated in Example 5. The yield of sebacic acid was 81.3% of theoretical, as determined by pH analysis; the yield of capryl alcohol was also approximately 81% of theoretical.

*Example 7.*—The intermediate product of Example 4B, after vacuum oven drying, was ground in a high-speed hammer mill (mikro-pulverizer) to yield a powder having an average particle size of 3.2 microns. This powder was charged at a rate of 30 lbs. per hour to the reaction apparatus used in Example 6. The inlet and outlet temperatures, and the source of heat, were the same as in Example 6. The product, by pH analysis, corresponded to a sebacic acid yield which was 84.4% of theoretical, the capryl alcohol yield also closely approximating the theoretical to the same extent.

*Example 8.*—This run was made in apparatus corresponding to that of Figure 2, the legs 10' and 18' having a 4-inch diameter. Tech. barium ricinoleate (622 lbs.), which had been drum dried to a substantially anhydrous condition, was combined with mechanically ground, anhydrous barium hydroxide (372 lbs.), this amount of barium hydroxide being 3.0 times the theoretical amount required for converting the indicated amount of tech. barium ricinoleate into barium sebacate. The resulting mixture was ground in the apparatus of Figure 1, the legs 10 and 18 having a 4-inch diameter, to give uniformity and a smaller particle size. This grinding resulted in an average particle size of 4.3 microns. This powder was charged to the indicated apparatus at a rate of 50 lbs. per hour. In this run, the reaction temperature was maintained at 295° C., the source of heat being superheated steam charged through nozzles 16' at a rate of 9 lbs. per lb. of feed stock. The reaction product was found, by gravimetric analysis, to contain sebacic acid in an amount corresponding to a 83.7% (of theoretical) yield; the capryl alcohol yield amounted to 83% of theoretical.

It will be noted that the preceding example utilizes an alkaline earth metal hydroxide as the strong alkali. The use of hydroxides and related compounds chosen from the alkaline earth metal group in the process of this invention is characterized by several distinguishing features, as contrasted with the use of the corresponding alkali metal compounds. Thus, the alkaline earth bases are more easily processed for use as a feed material because of their lack of hygroscopicity. The alkaline earth bases and their salts have higher melting points, so that the reaction for the conversion of ricinoleic compounds can be carried to completion substantially in the solid state. And the alkaline earth metal compounds can be readily recovered for re-use in the process of this invention; this is not convenient in the case of the alkali metal compounds because of their water solubility. Thus, the excess barium hydroxide can readily be recovered from the solid reaction product of Example 8, by leaching this material with water; this is possible because of the insolubility of the barium salts. And the barium chloride, formed by acidification of the salts with hydrochloric acid, can be used in the manufacture of the barium ricinoleate, a starting material in the instant process.

*Example 9.*—Tech. soduim ricinoleate (654 lbs.), which had been drum dried to a moisture content of 5%, was combined with mechanically ground NaOH (264 lbs.), this amount of NaOH being 4.0 times the theoretical amount required for converting the indicated amount of tech. sodium ricinoleate into sodium sebacate; or, 42.5 parts by weight of NaOH per 100 parts by weight of tech., anhydrous sodium ricinoleate. The resulting mixture was ground in the apparatus of Figure 1, the legs 10 and 18 having a 4-inch diameter, to give uniformity and a smaller particle size. This grinding resulted in an average particle size of 1.3 microns. This fine powder was charged to the apparatus of Figure 2, the legs 10′ and 18′ having a 6-inch diameter, at the rate of 115 lbs. per hour. The reaction temperature in this run was 195° C. Heat for the reaction was provided partially by heated nitrogen, which was charged through the nozzles 16′ at a rate of 8 lbs. per lb. of feed stock, the remainder of the heat being provided by heaters attached to the outside of leg 10′. Provision was made for collection and recirculation of the nitrogen. It should be noted that sufficient moisture for the reaction is provided via the water content of the tech. sodium ricinoleate. In this case, the acid product, recovered in good yield, was principally omega-hydroxydecanoic acid, the sebacic acid content of the acid product being approximately 10 wt. percent. Also, methyl hexyl ketone and capryl alcohol were recovered in yields matching those of the mono- and di-carboxylic acids, respectively.

*Example 10.*—This run was made in the apparatus of Figure 1, the legs 10 and 18 having an 8-inch diameter. The feed stock was the product of Example 4D. The feed rate was 200 lbs. per hour. The inlet temperature at manifold 15 was maintained at about 345° C., while the outlet temperature at classifier 19 was 265° C.; the reaction temperature in this run was 305° C. The source of heat for the reaction was super-heated steam, which was charged to the reactor at a rate of 8–12 lbs. of steam per lb. of feed stock. The fusion product, on gravimetric analysis, was found to contain sebacic acid in an amount equivalent to a yield of 74.0% of theoretical. The capryl alcohol yield also approximated 75% of theoretical.

*Example 11.*—The product of Example 4A was charged at a rate of 45 lbs. per hour to the reaction apparatus used in Example 6. The reaction temperature in this run was maintained at 385° C. Heat for the reaction was supplied partially by superheated steam, injected at a rate of 10–12 lbs./lb. of feed stock; this source of heat was supplemented by electric heaters attached to the exterior walls of the reaction zone 10. The reaction product was found, by gravimetric analysis, to contain sebacic acid in an amount corresponding to a 83.3% (of theoretical) yield; the capryl alcohol yield amounted to 83% of theoretical.

*Example 12.*—The product of Example 4C was charged at a rate of 30 lbs. per hour to the apparatus of Figure 2, the legs 10′ and 18′ having a 4-inch diameter. The reaction temperature in this run was maintained at 350° C., by means of superheated steam injected at a rate of 10–12 lbs./lb. of feed stock. This temperature was sufficiently high to carry the reaction mixture through the reactor in liquefied condition. The yields of sebacic acid and capryl alcohol amounted to 79.5% of theoretical.

*Example 13.*—Tech. sodium ricinoleate (553 lbs.), which had been spray dried to a moisture content of 4.7%, was mixed with mechanically ground NaOH (96 lbs.), this amount of NaOH being 1.4 times the theoretical amount required for converting the indicated amount of tech. sodium ricinoleate into sodium sebacate; or, 14.8 parts by weight of NaOH per 100 parts by weight of tech. anhydrous sodium ricinoleate. This mixture was ground in the mill used in Example 4A to yield a fine powder having an average particle size of 5.2 microns. This powder was charged to the apparatus of Figure 1, the legs 10 and 18 having an 8-inch diameter, at the rate of 200 lbs. per hour. The reaction temperature in this run was 285° C.–350° C., the source of heat being superheated steam charged at the rate of 8–10 lbs./lb. of feed stock. The yields of sebacic acid and capryl alcohol amounted to 81% of theoretical.

*Example 14.*—The product of Example 4A was charged at the rate of 30 lbs. per hour to the apparatus of Figure 1, the legs 10 and 18 having a 4-inch diameter. The reaction temperature in this run was maintained at inlet temperature of 350° C. by means of superheated steam injected at the rate of between 10 and 12 lbs. per lb. of feed stock. The outlet temperature of this run was 260° C. Reaction temperature was 305° C. The fusion product was collected in water; pH analysis of the resulting solution revealed that the sebacic acid yield was 81.1% of theoretical.

Examples 12 and 14 illustrate different feed stocks under similar operating conditions: in Example 12 Na₂CO₃ was used, whereas NaOH was used in Example 14.

*Example 15.*—The feed was prepared in a Werner-Pfleiderer mixer and shredded to give a particle size of 29.5 microns. This feed stock was made up of NaOH and tech. sodium ricinoleate, the amount of NaOH being 2.0 times the theoretical amount required for converting the indicated amount of tech. sodium ricinoleate into sodium sebacate. The feed rate was 200 lbs. per hour into the apparatus shown in Figure 1, in which the leg 18 was blocked off at 22 and leg 10 was 8-inches in diameter. The temperature at the inlet was 330° C. and at the outlet 250° C., reaction temperature being 290° C. Superheated steam was injected at the rate of 10–12 lbs. per lb. of feed stock. The fusion product was collected in water; pH analysis of the resulting solution revealed that the sebacic acid yield was 62.8% of theoretical.

*Example 16.*—Tech. sodium ricinoleate (350 lbs.) which had been spray dried, was combined with flake NaOH (148.5 lbs.), this amount of NaOH being 4.0 times the theoretical amount required for converting the indicated amount of tech. sodium ricinoleate into sodium sebacate. The resulting mixture was melted under vacuum at a temperature of about 200° C. This liquid feed stock was then charged to the apparatus of Figure 1, the legs 10 and 18 having a 4-inch diameter. The feed rate was 120 lbs. per hour, and was controlled by means of a proportioning pump, which served to meter the liquid feed into hopper 13. Fog-type nozzles were located at the lower end of inlet pipe 11, and the use of these nozzles ensured the fine particle size of the liquid feed as introduced into the reactor. The inlet temperature at manifold 15 was maintained at about 330° C., while the outlet temperature at classifier 19 was 250° C.; the reaction temperature in this run was 290° C. The source of heat for the reaction was superheated steam, which was charged to the reactor at a rate of 6–8 lbs. of steam per lb. of feed stock. Analysis of the fusion product showed the yield of sebacic acid amounted to 82.5% of theoretical. The capryl alcohol yield approximated that of the sebacic acid.

Advantages of using the liquid feed stock of this example include the ready elimination of air (which is desirably kept at a minimum in the reactor) from this type of feed stock; the presence of sufficient heat in the feed stock so as to minimize the heating load on the superheated steam or other source of heat; and more economical preparation of feed stock; in that various grinding steps could be eliminated.

Another convenient and desirable method of carrying out the alkali conversion of organic compounds also involves introducing the reactants into the apparatus in the liquid phase. In this method, the organic compound to be oxidized is not converted to a salt prior to its introduction into the reactor; such a reaction is illustrated by Examples 2, 3, and 18 herein. Thus, liquid organic compounds, which may be liquid at room temperature or may be converted into the liquid state by heating to temperatures above their melting points, are charged to the reactor through spray nozzles; molten alkali can also be charged to the reactor in a similar manner, as is detailed in the immediately preceding Example. It has been found that, under these conditions, all of the advantages of a liquid phase reaction are obtained. When the organic compound to be oxidized is a free acid or a derivative thereof, such as an ester or amide, sufficient alkali to convert such compounds to the corresponding alkali salt, in addition to the amount required for the actual fusion reaction, must be charged to the reactor. This elimination of the saponification of the organic compound as a separate step in the overall reaction has frequently proven to be an advantage. The use of heated elastic fluids and the other reaction conditions described herein is also of value here. In this method, the ricinoleic compound is not converted to a salt prior to its introduction into the reactor. Thus, liquid ricinoleic compounds, such as the lower monohydric alcohol esters of ricinoleic acid, are charged to the reactor through spray nozzles, the sodium hydroxide being charged to the reactor in the manner detailed above. It has been found that, under these conditions, the sodium hydroxide becomes molten in the reaction zone, which is maintained in the temperature range from about 180° to about 350° C., and all of the advantages of a liquid phase reaction are obtained. Similarly, solid ricinoleic compounds, which melt at or below the reaction temperature, may be used in place of the ricinoleic compounds which are liquid at room temperature. Sufficient sodium hydroxide to convert the ricinoleic compound used to sodium ricinoleate, and to convert the latter to, e. g., sodium sebacate must be charged to the reactor when a ricinoleic compound other than a ricinoleic acid salt is introduced into the reactor; as described above, an excess of sodium hydroxide over the stoichiometric amount is required in converting sodium ricinoleate to, e. g. sodium sebacate. Also, at least stoichiometric amounts of water must be present in the reactor during this reaction. The use of heated elastic fluids and other reaction conditions described above is also of value here. By the use of this technique for liquid phase reactions, the intermediate formation of ricinoleic acid salts prior to charging such salts to the reactor used in the process of this invention can be omitted, for these are formed in situ in the reactor. This frequently has proven to be an advantage.

*Example 17.*—Ground NaOH was charged through the screw feed 13 at the rate of 75 lbs. per hour into the apparatus of Figure 1 in which the leg 18 having an 8-inch diameter was blocked off at 22. At the same time methyl ricinoleate was separately sprayed into the mill above the mainfold at pipe 17 at the rate of 150 lbs. per hour, thereby providing a rate of 225 lbs. per hour of feed material in which the caustic soda is 250% in excess of the requirement for saponification and fusion. Superheated steam was injected through pipe 14 at the rate of 10–12 lbs. per lb. of feed material. Inlet temperature was 380° C., outlet temperature was 320° C. and reaction temperature was 350° C. The yield of sebacic acid, corrected for solubility, was 78.2% of theoretical, and a corresponding yield of capryl alcohol was obtained.

*Example 18.*—Oxidation of aliphatic mercaptans and thioethers. This run was made in copper-lined apparatus corresponding to that of Figure 2, the legs 10' and 18' having a 4-inch diameter. As in Examples 2 and 3, the organic compound to be oxidized and the alkali were introduced separately. Also, the organic compound to be oxidized (dodecyl mercaptan) was charged to the reactor in the liquid state. This run was continued for 4 hrs., the feed rates for dodecyl mercaptan and NaOH being 3 lbs. per hr. and 42 lbs. per hr., respectively. In addition to these reactants, a catalyst, finely-ground nickel-tungsten sulfide, was also charged to the reactor, being premixed with the NaOH; this catalyst was charged at the rate of 2 lbs. per hr. The reaction temperature was maintained at 250° C. Superheated steam was charged through nozzles 16' at a rate of 9 lbs. per lb. of feed stock, this steam being a source of heat for the reaction. The yield of the reaction product, sodium laurate, amounted to 80% of theoretical.

The reaction shown in this example is also applicable to other organic mercaptans and thioethers, in which the sulfur atom is attached to aliphatic carbon atoms. These compounds may contain substituents, such as an alicyclic group, an aromatic group, an alkoxy group, a halogen atom, a nitro group, an amino group, an alkyl amino group, etc. If unsaturated sulfur compounds are used as starting materials, the resulting carboxylic acids are also unsaturated. If more than one mercapto group is present in the starting compound, polycarboxylic acids are produced. As is true in the case of the reactions described in the preceding and following examples, the upper limit of alkali usage is not critical, and as much as 40 or more moles of alkali per mole of mercaptan or thioether may be used.

In addition, as indicated, a catalyst is required in the oxidation of mercaptans and thioethers by alkali fusion. Such catalysts are suitably selected from the group consisting of metals and metal compounds of group VI and group VIII metals of the periodic table. Suitable compounds of these heavy metals include, for example, sulfides oxides, tellurides, selenides, phosphides, and salts, especially of oxy-acids of the heavy metals, such as chromates, tungstates, vanadates, molybdates, etc. The amount of catalyst used may range from about 2% to 30% or more, based on the weight of the alkali.

Among the carboxylic acids which may be produced from mercaptans by this reaction are: butyric acid, valeric acid, trimethyl acetic acid, caproic acid, heptanoic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid, dicarboxylic acids, such as adipic acid and tetradecanedioic acid; and unsaturated acids, such as 4-tetradecenoic acid and oleic acid.

OXIDATION OF AROMATIC SULFONIC ACIDS

*Example 19.*—Oxidation of benzene sulfonic acid. Sodium benzene sulfonate (1500 lbs.) was combined with mechanically ground NaOH (1000 lbs.), this amount of NaOH being 3.0 times the theoretical amount required for converting the sodium salt into sodium phenolate. The resulting mixture was ground in the apparatus of Figure 1, the legs 10 and 18 having a 4-inch diameter, to give uniformity and a smaller particle size. This grinding resulted in an average particle size of 1.4 microns. This fine powder was charged to the apparatus of Figure 2, the legs 10' and 18' having a 5-inch diameter, at the rate of 75 lbs. per hr. The reaction temperature in this run was maintained at 300°–320° C. Heat for the reaction was provided by superheated steam. The yield of the indicated product amounted to 83% of theoretical; this product could be readily converted by known methods to phenol.

*Example 20.*—Oxidation of naphthalene sulfonic acid. Sodium naphthalene sulfonate (436 lbs.) was combined with flake NaOH (125 lbs.), this amount of NaOH being 1.7 times the theoretical amount required for converting this sodium salt into sodium naphtholate. This mixture, after being ground in the apparatus of Figure 1 to an average particle size of 1.1 microns, was charged to the apparatus of Figure 1, the legs 10 and 18 having a 5-inch diameter. The feed rate was 65 lbs. per hr., and the reaction temperature was maintained at 295°–305° C. The source of heat for the reaction was superheated steam, which was charged to the reactor at a rate of 6–8 lbs. of steam per lb. of feed stock. The indicated product was obtained in a yield of 84% of theoretical.

*Example 21.*—Oxidation of anthraquinone sulfonic acid. The sodium salt of anthraquinone sulfonic acid (400 lbs.) was combined with mechanically ground 90% NaOH (287 lbs.), this amount of NaOH being 2.5 times the theoretical amount required for converting this sodium salt into the sodium salt of dihydroxy anthraquinone, or alizarin. The resulting mixture was ground in the apparatus of Figure 1, the legs 10 and 18 having a 5-inch diameter, to give uniformity and a smaller particle size. This grinding resulted in an average particle size of 1.3 microns. This powder was then charged into the apparatus of Figure 1, the legs 10 and 18 having a 4-inch diameter, at the rate of 60 lbs. per hr. The reaction temperature was maintained at about 325° C. Heat for the reaction was provided partially by heated nitrogen, which was charged through the nozzles 16 at a rate of 8 lbs. per lb. of feed stock, the remainder of the heat being provided by heaters attached to the outside of leg 10. Provision was made for collection and recirculation of the nitrogen. The yield of the sodium salt of alizarin was 81% of theoretical.

*Example 22.*—Oxidation of dimethyl-alpha-naphthyl-amine-8-sulfonic acid. This run was made in apparatus corresponding to that of Fig. 2, the legs 10' and 18' having a 4-inch diameter. The sodium salt of this sulfonic acid (300 lbs.) was combined with mechanically ground NaOH (600 lbs.), this amount of NaOH being 13.7 times the theoretical amount required for converting the sodium salt of the sulfonic acid into the sodium salt of the corresponding di-methyl-alpha-aminonaphthol. The resulting mixture was ground in the apparatus of Fig. 1, the legs 10 and 18 having a 4-inch diameter, to give uniformity and a smaller particle size. This grinding resulted in an average particle size of 3.8 microns. This powder was charged to the indicated apparatus at a rate of 50 lbs. per hr. In this run, the reaction temperature was maintained at 375° C. The source of heat was superheated steam charged through the nozzles 16 at a rate of 10-12 lbs. per lb. of feed stock; heat was also supplied by means of heaters attached to the outside of leg 10. The desired reaction product, as indicated above, was obtained in a yield which amounted to 82% of theoretical.

*Example 23.*—Oxidation of lignin sulfonic acid. Lignin sulfonic acid (150 lbs.), obtained from sulfite waste liquor, and mechanically ground KOH (600 lbs.) were charged separately to the apparatus of Fig. 2, the legs 10' and 18' having a 4-inch diameter, at the rate of 55 lbs. per hr. (combined wt. of both reactants). The reaction temperature in this run was 275° C., the source of heat being superheated steam charged through nozzles 16' at a rate of 9-10 lbs. per lb. of feed stock. The sodium salt of the hydroxy compound corresponding to the sulfonic acid charged was obtained in a 77% yield.

In the prior art processes, the mechanical mixing of the reactants during the course of the reaction caused many complications. There is no such problem in the instant process, since the desired intimate mixing of the reactants is readily effected as a result of the turbulence set up by the introduction of jets of elastic fluid into the reactor. In some of the prior art processes, superatmospheric pressures were required. The present process proceeds smoothly at atmospheric or subatmospheric pressures. In other prior art processes, of a batch nature, pre-fusion of water and alkali was required, the fatty acid compound being introduced into the fused alkali slowly to prevent foaming to as great an extent as possible. In the instant process, an extremely rapid completion of the reaction occurs in a continuous manner and with the greatest simplicity. Cast iron, a relatively inexpensive metal, is an entirely suitable material of construction for the apparatus used in the process of this invention. In prior art processes, involving the use of baths of fused alkali or hot alkaline solutions or suspensions, cast iron corrodes at an undesirably fast rate; stainless steel provides some relief, but expensive nickel or nickel alloys are, from a practical standpoint, required as the material of construction for apparatus used in prior art processes. A further advantage of the present process is the high yields of desired products. Also, the operation of this process in the presence of steam or an inert gas serves to form products of higher quality than previously attainable.

Obviously, many modifications and variations of the invention as hereinbefore set forth, will be apparent to those skilled in the art and are within the spirit of the appended claims.

What is claimed is:

1. A continuous process for the oxidative alkaline fusion of aliphatic organic compounds selected from the group consisting of unsaturated aliphatic acids and functional derivatives thereof, which comprises: (*a*) charging the aliphatic organic compound and an effective amount of a strong base, both of these compounds being in finely divided form, the particle size of said compounds, when charged as solids, not exceeding about 10 microns, into an enclosure, at least stoichiometric amounts of water being present in said enclosure; (*b*) introducing an elastic fluid selected from the group consisting of steam and inert gases substantially simultaneously into said enclosure to convey said charged compounds and the reaction products thereof through said enclosure; and (*c*) heating the contents of said enclosure to an elevated temperature of about 180°–425° C.

2. The process of claim 1, in which said organic compound is a salt of a strong base.

3. The process of claim 1, in which at least one of said organic compound and said strong base is in liquid state prior to being charged into said enclosure.

4. The process of claim 1, in which said strong base is selected from the group consisting of alkali, alkaline earth, and quaternary ammonium oxides, hydroxides, and carbonates.

5. The process of claim 1, in which said organic compound is a salt of a strong base, and the amount of said strong base charged into said enclosure is at least 1.4 times the stoichiometric amount.

6. The process of claim 1, in which said enclosure is elongated.

7. The process of claim 1, in which said elastic fluid is superheated steam.

8. The process of claim 1, in which said elastic fluid is an inert gas.

9. A continuous process for the oxidative production of the sodium salt of an aliphatic organic compound, which comprises: (*a*) preparing a substantially dry, intimate mixture of the sodium salt of an unsaturated aliphatic acid, sodium hydroxide, the latter being present in an amount which is at least 1.4 times the stoichiometric requirements, and not more than 5% of water, said intimate mixture having a particle size not exceeding about 10 microns; (*b*) charging said mixture into an enclosure, at least stoichiometric amounts of water being present in said enclosure; (*c*) introducing an elastic fluid selected from the group consisting of steam and inert gases substantially simultaneously into said enclosure to convey the finely divided reaction mixture through said enclosure; and (*d*) maintaining the interior of said enclosure at a temperature in the range from about 180° to about 425° C. and at substantially atmospheric pressure.

10. A continuous process for the oxidative alkaline fusion of an aliphatic organic compound selected from the group consisting of unsaturated aliphatic acids and functional derivatives thereof which comprises pyrolyzing a substantially non-fluid, saponified, finely divided solid mixture of an alkali and said organic compound, said mixture having a particle size not exceeding about 10 microns, while said mixture is being conveyed by steam through the pyrolysis zone at substantially atmospheric pressure.

11. A continuous process for the oxidative alkaline fusion of aliphatic organic compounds selected from the group consisting of unsaturated aliphatic acids and functional derivatives thereof, which comprises: (*a*) mixing the aliphatic organic compound with an effective amount of a strong base to form a reaction charge; (b) introducing said reaction charge in finely divided form, the particle size thereof, when said charge is solid, not exceeding about 10 microns, into an enclosure, at least stoichiometric amounts of water being present in said enclosure; (c) introducing an elastic fluid selected from the group consisting of steam and inert gases substantially simultaneously into said enclosure to convey said charge and the reaction products thereof through said enclosure; and (d) heating the contents of said enclosure to an elevated temperature of about 180°–425° C.

12. The process of claim 1, in which said organic compound is a salt of an unsaturated aliphatic acid.

13. The process of claim 1, in which said organic compound is a salt of oleic acid.

14. The process of claim 1, in which said organic compound is a salt of undecylenic acid.

15. The process of claim 1, in which said organic compound is a salt of crotonic acid.

16. The process of claim 1, in which said contents are removed from said enclosure without substantial preliminary cooling of said contents.

References Cited in the file of this patent

UNITED STATES PATENTS

| | | |
|---|---|---|
| 2,384,817 | Chitwood | Sept. 18, 1945 |
| 2,407,044 | Tyres | Sept. 3, 1946 |
| 2,572,238 | Ballard et al. | Oct. 23, 1951 |
| 2,580,931 | Lane | Jan. 1, 1952 |

FOREIGN PATENTS

| | | |
|---|---|---|
| 672,512 | Great Britain | May 21, 1952 |
| 497,146 | Belgium | Aug. 14, 1950 |